May 19, 1931.  C. A. McKENNY  1,805,879

MECHANICAL OVERLOAD RELEASE

Filed May 6, 1929

INVENTOR
Charles A. McKenny

BY

ATTORNEYS

Patented May 19, 1931

1,805,879

UNITED STATES PATENT OFFICE

CHARLES A. McKENNY, OF DETROIT, MICHIGAN, ASSIGNOR TO THE JOSEPH E. BARRETT CO., OF DETROIT, MICHIGAN, A CORPORATION OF MICHIGAN

MECHANICAL OVERLOAD RELEASE

Application filed May 6, 1929. Serial No. 360,716.

My invention relates to an excess load release serving as a safety device for the protection of conveying and other power-driven machinery against damage resulting from accidental obstruction to the movement thereof, such accidental obstruction usually not being accompanied, as it should be for protective purposes, by a simultaneous shutting off of the driving power.

The primary objects of my invention being the prevention of breakage of machinery or of the means for supporting or driving it, as well as elimination of damage to the goods transported or otherwise handled or produced thereby, with consequent avoidance of production losses due to delays for expensive repairs, I have sought to attain these objects by developing a simple, inexpensive, mechanical means for automatically reducing the driving stress on the machinery approximately to zero immediately upon the occurrence of an obstruction load greater than that for which provision is made by using in the overload-release device a driving bar of predetermined load-carrying capacity under the shearing stress of the driving force applied in actuating the machinery to which the overload release is attached.

A secondary object of my invention is to effect a marked reduction in the cost of labor and materials in making service repairs in restoring the overload release to its original operative effectiveness after the shearing of its driving bar takes place. Also to obviate the necessity for keeping in stock expensive repair parts with which to forestall production delays.

Another object achieved in making my device simple, as well as easily and quickly restorable to perfect working condition, is a closer approach to satisfaction of the modern demand for that uninterrupted operation which is essential in order to meet manufacturing schedules that tax the capacity of the machines involved. Ease of making drive-bar replacements is a result of extreme accessibility to the driving slots in which the drive bar is held.

Figure 1:
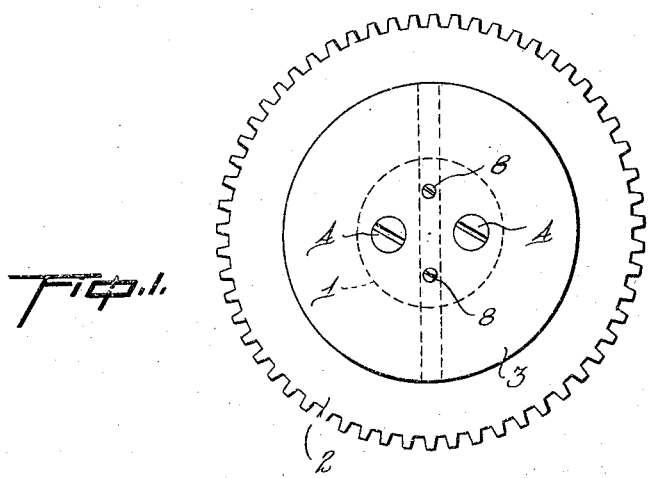
Figure 2:
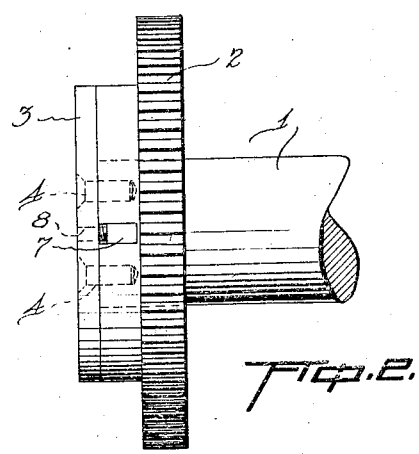
Figure 3:
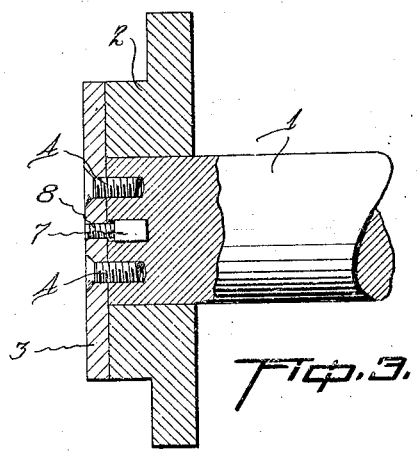
Figure 4:
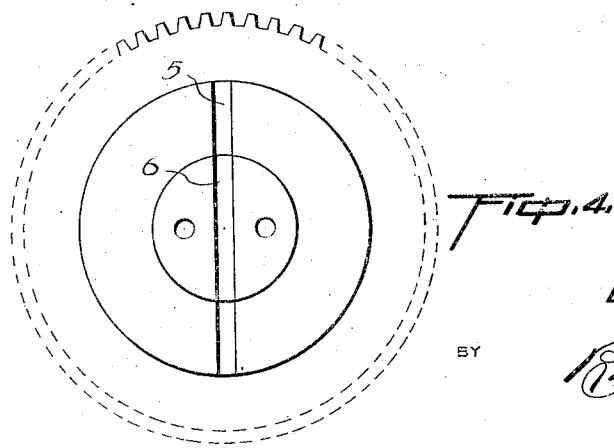

Of the accompanying drawings which show clearly the nature and application of my invention, Figure 1 is a plan view of the device;
Figure 2 is a side elevation;
Figure 3 is a cross sectional view, and
Figure 4 a plan view with combined cover and drive-bar holding plate removed to show the aligned slots in the end of the drive shaft and hub of the drive gear.

In all these views the reference figures used apply to the same parts, 1 representing the shaft through which the driving or propelling force is transmitted to the drive gear or sprocket 2, a plate 3 fastened to the end of the drive shaft 1 by screws 4 serving to protect the transversely disposed slot 5 cut in the drive gear or sprocket hub and similarly disposed aligned slot 6 cut in the end of the drive shaft 1, the slots 5 and 6 being provided to receive a driving bar 7, held in place by the screws 8.

In making application of my invention the drive bar 7 held in the aligned transversely disposed hub and shaft slots 5 and 6 is made of a material and of a section suitable for withstanding a shearing stress corresponding to the load that the machinery may carry safely up to but not beyond the predetermined limit of overload capacity of the drive bars of which a plurality may be used if desired or whenever a single bar is temporarily unavailable.

As compared with an application of ordinary keys of different materials and shearing load-carrying capacities in keyways cut in drive shaft and drive gear or sprocket hub in the direction of the length of the shaft, my invention presents the advantage of an arrangement or combination of parts much more readily disassembled after shearing of the driving bar or bars, which need not fit the driving slot with the degree of completeness and tightness considered desirable when power transmitting parts are keyed together in the usual way.

The depth of the transversely disposed centrally located shaft and hub slots is such as to provide for a wide range of load-carrying capacities through change in drive bar sections or sizes, variation in load-carrying capacity for given sections also being obtainable through use of different materials.

Having described my simplified, inexpensive, yet effective means for automatically throwing off the power transmitted to moving machinery through the shaft to which my safety device is attached, what I desire to secure by Letters Patent finds expression in the following claims.

What I claim is:

1. The combination with a power-transmitting shaft and a loosely mounted sprocket thereon of means adapted to serve normally as a driving connection therebetween, said means comprising one or more metal bars held in alined transversely disposed slots cut in the end of the power-transmitting shaft and sprocket hub respectively, said driving connection being broken automatically when the safe-load carrying capacity of the driving means is exceeded.

2. The combination with a drive shaft and a sprocket loosely mounted thereon and driven thereby, of driving means therebetween comprising one or more metal bars or rods of predetermined load carrying capacity held in aligned transversely disposed slots cut in the end of the drive shaft and in the sprocket hub, the driving stress on said sprocket and connected mechanism being released automatically by shearing of the driving bar or bars whenever an unintentional obstruction to movement increases said stress beyond the safe-load carrying capacity of said bar or bars, said drive shaft in the sprocket or gear hub then being free to rotate independently, thus protecting from breakage or other injury the machinery or parts normally driven thereby.

3. In an overload release for the protection of moving machinery, means for automatically reducing to zero the driving stress thereon immediately upon occurrence of an obstruction load in excess of the breakage factor of safety, said means comprising a drive bar or plurality of bars of predetermined load-carrying capacity, said drive bar or bars serving as a shearable driving connection between the drive shaft and the drive gear or sprocket through which the power delivered by the drive shaft is transmitted to the moving machinery, said drive bar or bars being held in centrally-located transversely disposed aligned slots in the end of the drive shaft and hub of the drive gear or sprocket by means of screws passing through a plate covering the drive bar and the shaft- and gear-hub driving slots, said cover plate being fastened to the slotted end of the drive shaft by screws.

4. In a protective or safety device of the character described, a drive shaft having in one end thereof a centrally-located transversely-disposed slot of a depth such as to provide for the use therein of driving bars of load-carrying capacities varying with the section and kind of material in said bars, a drive gear or sprocket for transmitting to moving machinery the power delivered to the drive shaft, the hub of said drive gear or sprocket having a centrally-located transversely-disposed slot of dimensions corresponding to those of the drive-shaft slot, and normally positioned in alignment therewith, a drive bar or bars of predetermined load-carrying capacity, depending on material and cross sectional area, adapted to be placed in the shaft and hub slots when they are brought into alignment for that purpose, a covering plate protecting said slots and drive bar, said cover plate being fastened to the drive shaft by screws, the drive bar, which serves as the driving connection between the drive shaft and the drive gear or sprocket through which the machinery is moved being held in said slots by screws passing through the cover plate, said screws serving to prevent shifting of the central section of the bar or bars after the driving stress on the machinery is relieved by shearing of the drive bar or bars upon occurrence of an overload greater than that for which the selected factor of safety against breakage or other damage provides.

5. A device of the character described comprising a driven shaft having a transverse groove formed in the end thereof, a wheel loosely mounted upon said shaft and having a transverse groove formed in the outer end thereof, and a plate secured to the end of said shaft and adapted to support a driving bar in both of said transverse grooves in a manner whereby removal of said cover plate permits removal of the sections of said driving bar after shearing thereof.

In testimony whereof I affix my signature.

CHARLES A. McKENNY.